Aug. 9, 1932.  J. W. BRYCE  1,870,233
WEIGHING SCALE
Filed Nov. 26, 1926   4 Sheets-Sheet 1

Inventor
JAMES W. BRYCE
By his Attorney
W. W. Wilson

Aug. 9, 1932.  J. W. BRYCE  1,870,233
WEIGHING SCALE
Filed Nov. 26, 1926  4 Sheets-Sheet 2
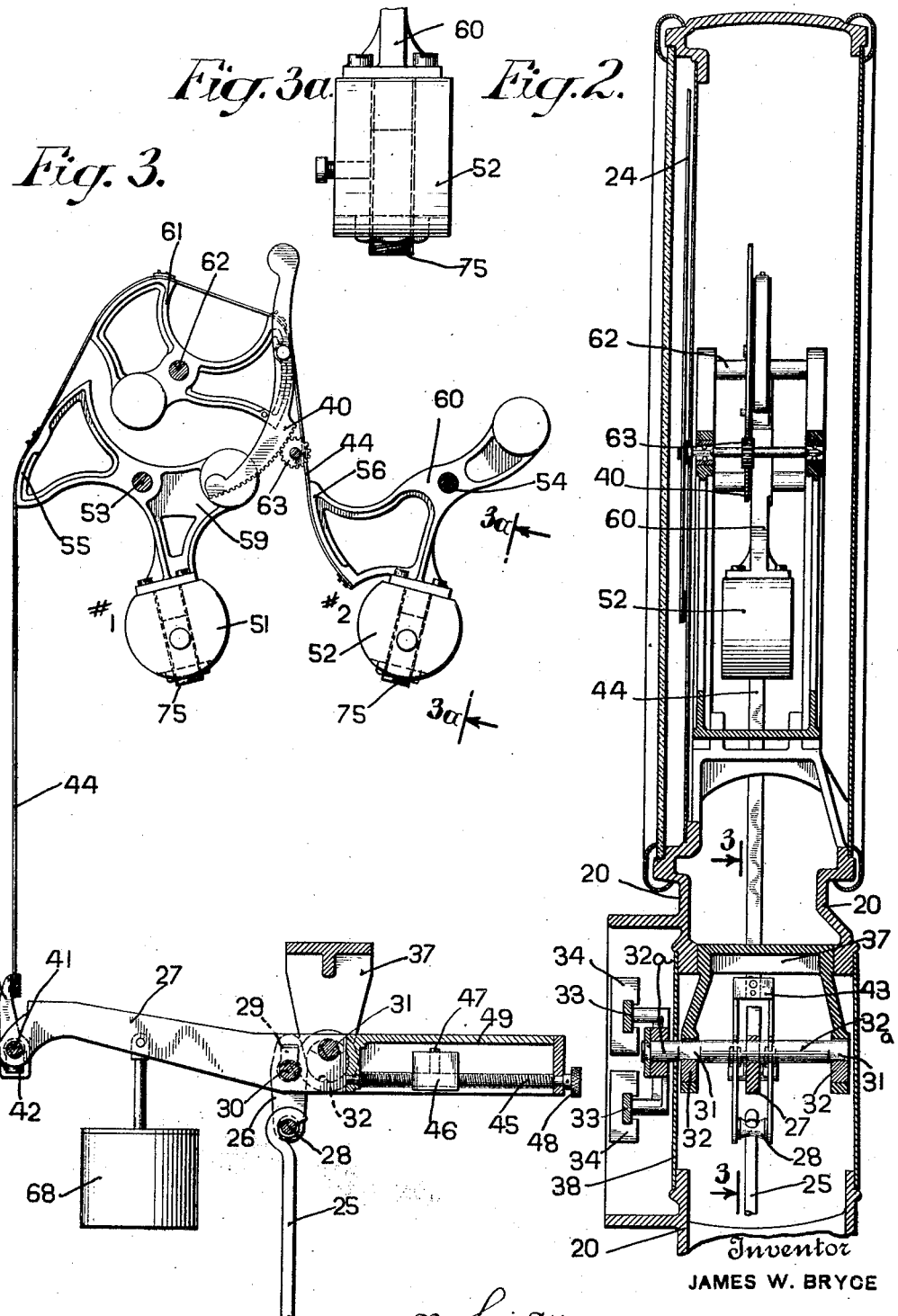
Inventor
JAMES W. BRYCE
By his Attorney Aug. 9, 1932.    J. W. BRYCE    1,870,233
WEIGHING SCALE
Filed Nov. 26, 1926    4 Sheets-Sheet 3

Inventor
JAMES W. BRYCE
By his Attorney
W. W. Wilson

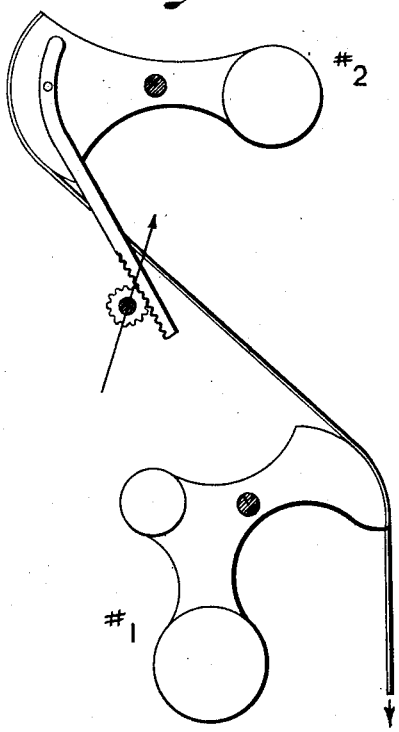
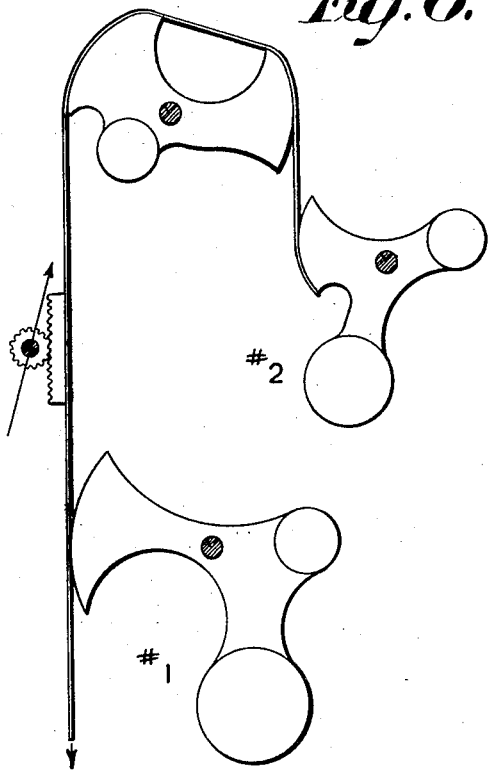
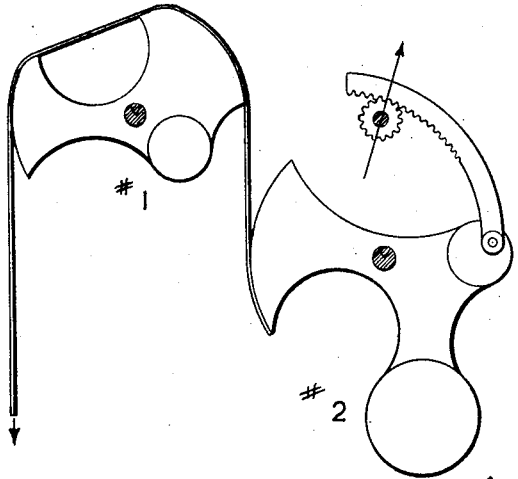

Patented Aug. 9, 1932

1,870,233

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

WEIGHING SCALE

Application filed November 26, 1926. Serial No. 150,735.

The invention concerns weighing scales and more specifically scales of the pendulum type in which the load is offset by one or more pendulum systems which are rotated about pivot points in response to displacement of the scale beam. Scales of this type will weigh well within the limits of required accuracy if they are carefully leveled but in the case of high capacity scales it is often desirable to move them quickly from one place to another and such scales are often mounted on wheeled trucks for this purpose. In such a case no particular attempt is usually made to level the scale before weighing on it and in many cases where weighing operations are to be performed at the entrance of a warehouse the scale may even be placed on a slight ramp causing it to tilt appreciably from its normal upright position. Errors in weighing from such tilting are due principally to the effects on the pendulum system and to the effects on the scale beam. It is customary to construct the scale so that the errors from these two sources compensate each other and thus cause a given load on the scale platform to effect equal displacements of the index pointer when the scale is level or tilted to any reasonable angle. As the construction of the scale beam, platform and main levers is usually determined by considerations which make it impractical to adjust the tilting error in this section of the mechanism, the necessary adjustment is ordinarily made in the pendulum system and this adjustment forms part of the sealing process. To this end the pendulums and pendulum supports are provided with a multiplicity of adjusting means which must be operated concurrently during sealing and the adjustment of each of which affects the adjustment of each of the others, thus making the sealing process a tedious one requiring the services of a very skillful operator.

According to the present invention I construct the pendulums and pendulum supports so that all necessary adjustments on each system may be made by a single adjusting device through which the center of mass of the pendulum weights may be shifted along a fixed predetermined line to change its moment about its pivot, thus permitting a single adjustment on each system to divide the weighing load as desired among the several systems and compensate for the tilting error. Furthermore as the adjustment on each system is limited to shifting the center of mass of the pendulum weight along a fixed line the effect of a given adjustment on one system can be accurately predetermined on the others.

According to the preferred form of the invention each pendulum supporting structure without the pendulum weight is accurately balanced about its pivot so that no unbalanced forces are effective in this part of the device. Preferably this structure is in the form of a single piece which is balanced by filing or otherwise removing surplus material so that after the initial balancing when the scale is assembled no further adjustment is necessary. The pendulum weight is then affixed to its support having its mass symmetrically distributed about a radial line extending from the pivot of the supporting structure. All adjustments of the system may then be made by shifting the center of mass of the pendulum weight along the radial line and sealing and all other necessary pendulum adjustments may be effected by this simple adjustment.

Scales of this type also require each pendulum system to move in unison through equal angles in offsetting a weighing load and according to the preferred form of the invention only one pendulum system is connected directly to the scale beam while the others are connected to the operating cam of this system. This ties the systems together so that any movement of one system in response to a weighing operation causes an equal movement on all others. Preferably a single flexible element or tape is used for connecting all the systems to the beam, the element being fastened at one end to the scale beam and then extending serially to all the operating cams and sectors of the several systems, being fastened to each cam or sector.

The principal object of the invention is to provide a scale of the required accuracy and in which the load offsetting mechanism and its attachment to the scale beam consist of new and novel construction and arrangement of elements.

A more specific object of the invention is to provide a scale which is automatically compensated for any reasonable degree of tilting and in which new and novel means are provided to permit sealing and adjustment for compensation.

Another object of the invention is to provide a scale of the multi-pendulum type in which the several pendulum systems are connected to the scale beam by a single connecting device.

Another object of the invention is to provide a scale of the multi-pendulum type in which a single flexible element connects the several pendulum systems to the scale beam and distributes selected proportions of the load to the several systems.

Another object of the invention is to provide a scale in which all necessary adjustments on each pendulum system may be made by a single adjusting device.

Another object of the invention is to provide a scale in which the center of gravity of the pendulum system may be readily shifted along a fixed line.

Another object of the invention is to provide a scale in which the load offsetting mechanism consists of pendulum systems conforming substantially in their characteristics to simple pendulums.

The invention is illustrated in several exemplary embodiments in the accompanying drawings which have been chosen rather with a view to clearness in disclosure than limitation in structure and arrangement but which nevertheless include preferred forms of the device. Reference will now be had to the drawings which should be read in connection with the following detailed description and in which the same reference numerals refer to the same parts throughout the several views.

Fig. 2 shows a section on line 2—2 of Fig. 1;

Fig. 3 is a detail showing the load offsetting mechanism and the scale beam removed from the casing;

Fig. 3a is a view of a pendulum weight from line 3a—3a of Fig. 3;

Figs. 5, 6 and 7 are modifications of the details in Fig. 3 but operating broadly on the same principles

Figure 1:
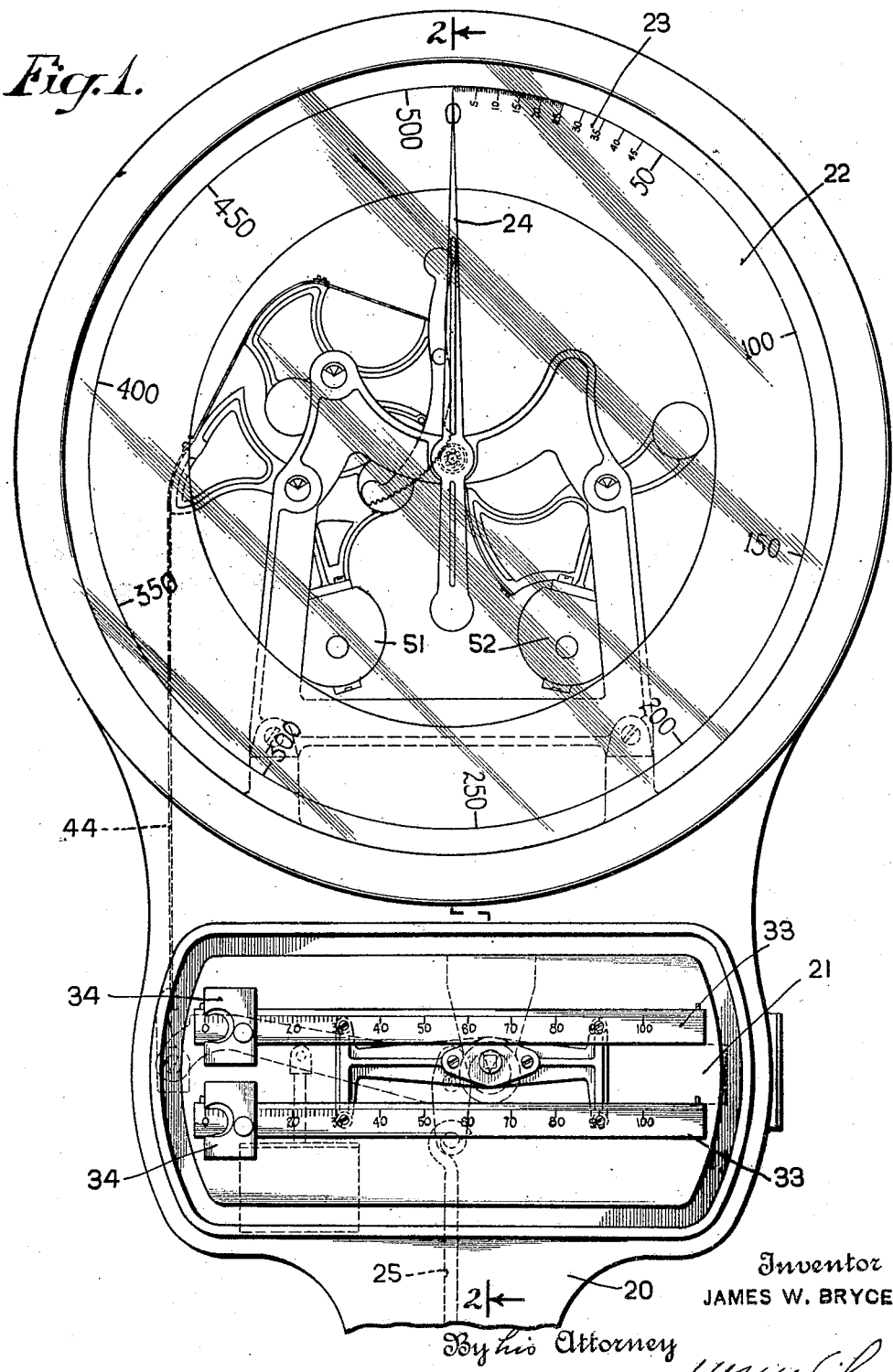
Fig. 1 shows an elevation of the upper part of the scale standard which is formed into a casing for the load offsetting mechanism and a corresponding casing for the scale mechanism.

The scale illustrated in Figs. 1 to 3 is of the heavy capacity type and is adapted to be mounted on a suitable truck provided with wheels to enable it to be freely moved about. As usual in such scales the main levers may be enclosed in the truck or base portion with the platform forming a top covering therefor and operatively connected with the main levers to cause displacement of them during weighing operations. This mechanism is well known and has not been illustrated in the drawings. At one end of the base the hollow standard or column illustrated in fragmentary form at 20 in Figs. 1 and 2 is supported and is provided with two enlargements indicated generally at 21 and 22 of which the former encloses the scale beam with its associated mechanism and the latter forms a casing for the load offsetting mechanism and supports the scale dial 23 with which the index arm 24 coacts. The main levers of the scale may be connected by means well known in the art with the steelyard 25 whose upper end is formed into a hook and engages a shackle 26 supported by the scale beam 27 to displace the latter in proportion to the displacement of the main levers. The shackle 26 consists of two side plates joined by a short rod 28 with which the hook end of the steelyard engages and each side plate is provided with an aperture in each of which is lodged a bearing 29 to form a seat for the knife edges 30 fastened to opposite sides of the scale beam. The scale beam is fulcrumed on knife edges 31 on opposite sides thereof which seat in bearings 32 placed in the downwardly extending arms of a yoke 37 supported by the standard 20. The knife edges 31 are formed in shafts 32a of which that extending toward the front of the standard projects through an opening therein and carries the tare beams 33 at its outer end thus making the tare adjusting weights 34 accessible from the outside of the scale casing. The opening in the standard is covered by a plate 38 perforated to permit the passage of the shaft 32a therethrough, thus providing a dust-proof arrangement for connecting the tare beams to the scale beam. The scale beam 27 is a lever of the third order and its nose carries a knife edge 41 seated in a bearing 42 supported by a yoke 43 which is attached to the tape 44. The tape 44 in this case forms the single connecting link between the scale beam and the load offsetting mechanism. The rear portion of the scale beam 27 is provided with a small casing 49 longitudinally of which extends a feed screw 45 for moving the zero adjusting weight 46 which may be locked in any adjusted position by set screw 47. A knurled button 48 on the end of the feed screw permits adjustment of the weight 46 when desired. The oscillations of the scale beam 27 in response to changes of load on the scale platform are suitably damped by a dash pot 68.

The flexible tape 44 is connected at its lower end to the nose of the scale beam by means of the yoke member 43 and is connected at its upper end to the load offsetting mechanism consisting of two pendulums 51 and 52 pivoted respectively at 53 and 54 and each movable in a single quadrant in response to weighing operations. The supporting member of the pendulum 51 carries a cam member 55 to which the tape 44 is attached and the supporting structure of the pendulum 52 carries a sector member 56 to which the tape 44 is likewise attached, the tape being properly guided with respect to the cam 55 and sector 56 by a double sector 61 pivoted at 62. The sector surfaces on the members 56 and 61 are struck off by circular arcs from the pivot points 54 and 62. The cam 55, however, does not conform to an arc about its pivot 53 as it is formed to compensate for the changing moments of the offsetting pendulums. The load offsetting moment of each pendulum system is equal to the product of the mass of the pendulum times the sine of the angle which its arm makes with the vertical. But as this angle becomes progressively larger, the increment of its sine for a given change in the angle becomes progressively smaller and if the angular movement of the pendulum were the same for a given increment of load throughout its travel the load graduations on the scale dial would be unevenly spaced. The cam 55 as usual in scales of this type is designed so that in spite of the different offsetting moments of the pendulum systems a given increment of load on the scale platform will always cause an equal displacement of the index arm and consequently the graduations on the scale dial may be equally spaced from each other.

The index arm 24 is mounted on an arbor extending into the load offsetting casing and on which is fixed a small pinion 63 coacting with a rack 40 mounted on the sector member 61. With the exception of the pendulums proper 51 and 52 all of these pivoted structures in the load offsetting mechanism are accurately balanced so that neglecting the weight of the pendulums they might freely come to rest in any position. In other words the actuating force of the load offsetting mechanism is concentrated in the pendulum weights themselves which act in the manner of a concentrated mass suspended on a weightless rigid structure. This construction permits of easy adjustment of the pendulum systems to cause each to take its desired share of the load and adjusting weights in the form of screws shown at 75 are provided for this purpose. Preferably the systems are adjusted so that each takes one half of the load when the scale is level. Fig. 3 indicates the zero registering position of the scale parts and it will be observed that the centers of mass of the pendulums 51 and 52 are not vertically beneath their pivot points but are slightly offset from this position. In other words the pendulums have been slightly rotated in opposite directions around their pivot points, the force for this initial displacement being applied to the tape 44 which is properly tensioned by the action of the scale platform and the main levers on the scale beam 27. This initial displacement of the pendulums when properly chosen in accordance with the principles stated above provides for compensating all errors due to tilting as will now be explained.

Figure 4:
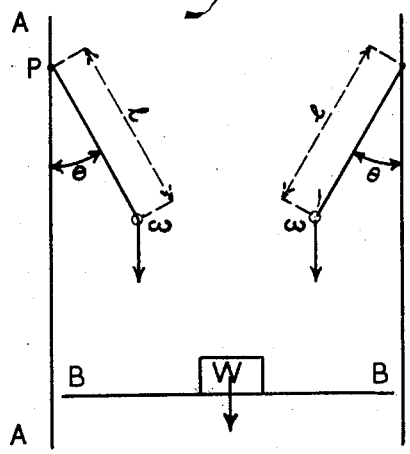
Figs. 4 and 4a are diagrams illustrating the principle of operation of the scale.

Fig. 4 shows a diagrammatical representation of the scale structure and forces when the structure is in normal upright position. The lines AA and A'A' represent vertical lines of the scale structure, when the scale is level. The scale platform is indicated diagrammatically at BB and although no operating connections are shown it will be understood that downward displacement of this platform causes the pendulums indicated at $w$ to swing about their pivot points P and P' as indicated. A weight W on the scale platform is exerting a downward force on the scale levers and displacing the pendulums through an angle $\theta$.

Each pendulum offsets half the load and the offsetting moment of each pendulum is $w1 \sin \theta$ or the total offsetting moment of the two is $2w1 \sin \theta$. In this case the total gravitational pull on the weight W is effective in a direction normal to the scale platform BB.

Figure 4A:
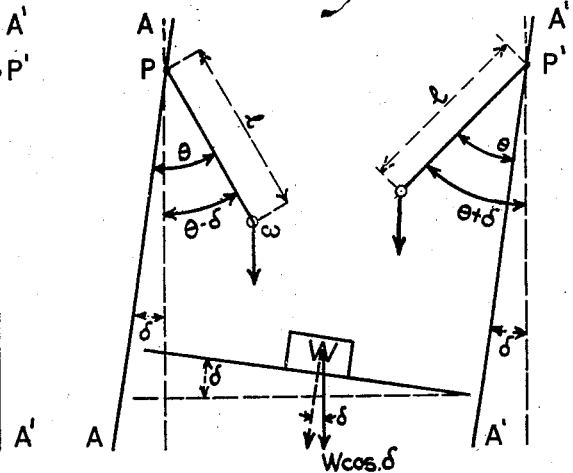

Referring to Fig. 4a a similar condition is shown with the scale tilted at an angle $\delta$ to the vertical with the pendulums $w$ still displaced through angles $\theta$ to the lines AA and A'A' respectively although in this case the pendulum to the left is displaced through an angle $\theta - \delta$ to the vertical and the pendulum to the right is displaced through an angle $\theta + \delta$ to the vertical. In this case the load offsetting moment for the pendulum to the left is $w1 \sin (\theta - \delta)$ and for the pendulum to the right is $w1 \sin (\theta + \delta)$ or the total of the load offsetting moment is the sum of these, namely $$w1 \sin (\theta + \delta) + w1 \sin (\theta - \delta) = 2w1 \sin \theta \cos \delta.$$

If this total moment is subtracted from the total moment derived with respect to Fig. 4 the result will be the loss in effective offsetting moment of the pendulum mechanisms due to tilting the scale. The difference in these moments is $$2w1 \sin \theta - 2w1 \sin \theta \cos \delta = 2w1 \sin \theta (1 - \cos \delta)$$

or in other words the tilting of the scale decreases the offsetting moment of the pendulum by the factor $1 - \cos \delta$.

In the case of Fig. 4 the scale platform

BB is horizontal and the gravitational force of a weight W placed thereon acts normal to its surface and is totally effective in displacing the scale levers. In the case of Fig. 4a, however, the platform BB has been tilted through an angle δ to the horizontal and the weight W placed thereon is no longer fully effective in displacing the scale levers but only the component normal to the surface of the platform BB is so effective and this component is W cos δ. The effectiveness of the weight W in displacing the scale levers has therefore been reduced by an amount W−W cos δ or W(1−cos δ) owing to the tilting of the scale. But as the factor 1−cos δ represents the proportional decrease in the moment of the pendulum systems as well as the decrease in the effective pressure of the weight on the scale platform, it is obvious that a given weight will cause the same displacement of the pendulum systems and consequently of the indicator hand regardless of whether the scale is level or tilted.

This effect, or course, results from the normal offset of the pendulums about their pivots, and the compensating effect is limited to an angle equal to the initial angle of offset of the pendulums as when this angle is exceeded the moment of one of the pendulums will be reversed in direction about its pivot and the compensating effect destroyed. This angle may be made as large as desired within reason, however and this feature presents no material limitation.

The explanation thus far has accounted for compensation for sidewise tilting but the scale may be tilted in an endwise direction. In this case the platform may also be inclined at an angle δ to the horizontal and the effective component of a weight W in displacing the scale beam is again reduced to W cos δ. Here the arms of the pendulums, while maintaining their initial angle of offset about their pivots, are each inclined at an angle δ to the vertical and as the gravitational pull on the pendulum weights still acts vertically downward the effective component of this pull on the arms is reduced to w cos δ for each pendulum. Both the effective weighing load and the effective offsetting moment have again been decreased by the same factor, in this case cos δ, and a given weight on the scale platform causes a given displacement of the index arm in spite of tilting in an endwise direction. Tilting in any other direction will be compensated for by a combination of these effects.

It is not essential that the pendulums 51 and 52 be located horizontally opposite each other as shown in Fig. 3. If desired, they may be located one below the other as indicated in Figs. 5, 6 and 7. In Fig. 5 the No. 1 pendulum is shown mounted directly below the No. 2 pendulum and the rack for operating the indicator arm is mounted on the No. 2 pendulum. With this particular arrangement an intermediate guiding sector for the tape between the two pendulums may be unnecessary. Fig. 6 shows an arrangement similar to Fig. 5 in the relative location of the pendulums but a guiding sector has been provided between the pendulums and the indicator rack is mounted directly on the tape. Fig. 7 shows still another arrangement in which the No. 1 pendulum is arranged above the No. 2 pendulum and the rack for operating the indicator arm is mounted on the No. 2 pendulum supporting structure. In this case the guide sector for the tape between the pendulums is formed integrally with the supporting structure of pendulum No. 1.

Figure 8:
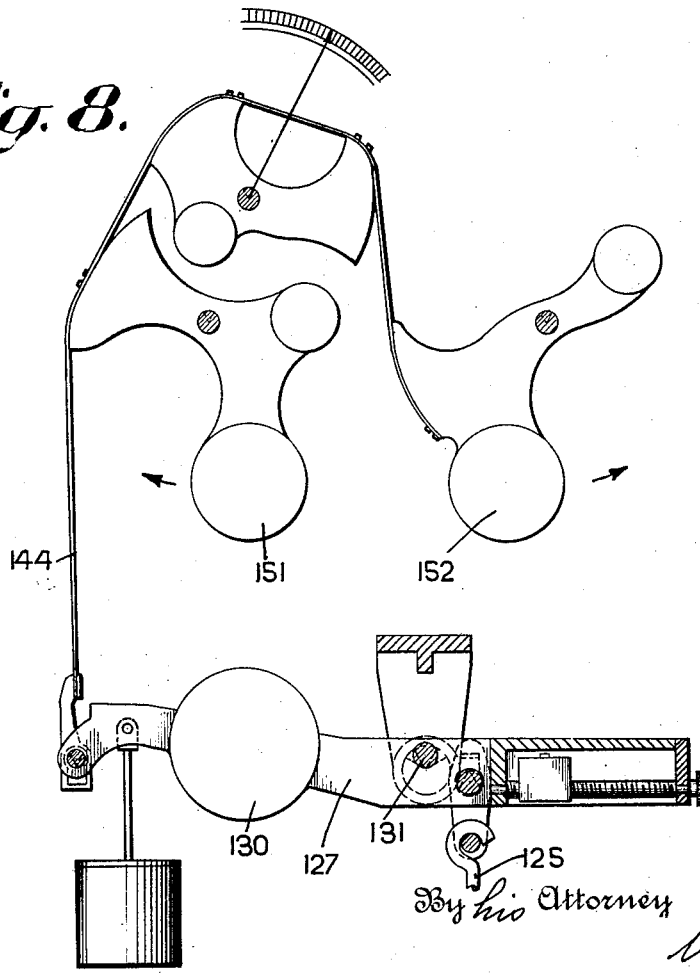
Fig. 8 is a detail of a modification of the device shown in Fig. 3 in which the load offsetting mechanism is normally displaced to the limit of its travel and in which the weighing operation moves it toward normal freely suspended position.

The modifications hitherto described are all of the conventional type in which a weight on the scale platform provides the force for displacing the load offsetting mechanism. It is quite possible, however, to realize the advantages of this invention in a scale in which the load offsetting devices are normally displaced to the limit of their travel by a counterweight coacting with the scale beam and in which a load on the scale platform partially or wholly balances the counterweight to restore the load offsetting devices toward their normal freely suspended positions. Such an arrangement is shown in Fig. 8 in which a steelyard 125 coacts with a scale beam 127 as in Fig. 3 but in which a counterweight 130 has been placed upon the scale beam between its fulcruming knife edge 131 and its nose to tension the tape 144 and displace the pendulums 151 and 152 to the limit of their active travel. The steelyard 125 connecting the scale beam 127 with the main scale levers is placed on the opposite side of the knife edge 131 to the counterweight 130. In this case a load on the scale platform tends to balance the counterweight 130 and permits the pendulum 151 to move downward to effect operation of the indicating mechanism. The index arm or pointer in this case is mounted on the intermediate sector and may play over a fan chart. This arrangement presents some advantages which are not present in the other arrangements. It will be noted that if a heavy weight is thrown suddenly on the platform of a scale of the conventional type a heavy impact will be delivered to the connecting tape as there is very little cushioning effect between the platform and the points of attachment of this tape to the scale beam. In the arrangement shown in Fig. 8, however, such an impact tends to release the existing tension on the tape 144 and therefore causes a substantially smaller shock to the operating mechanism. Furthermore the most serious shock to a mechanism such as disclosed in Fig. 8 would occur when the weight was lifted off the scale platform, and while it is quite possible to throw a heavy load suddenly on a scale platform it is practically impossible under normal operating conditions to remove it as suddenly. This of course relieves the scale of its worst operating strain.

The invention has now been described in regard to several physical embodiments which represent the preferred forms in which it may be practiced. It is obvious, however, that many modifications of the structure and arrangement of element will readily occur to those skilled in the art and that the improvements in whole or in part may be applied to other scales of widely differing characteristics; for example, even a scale which is fixed may be provided with this type of mechanism in which case careful leveling of it will not be essential, and its cost of installation consequently reduced. The invention is intended to be limited therefore only as indicated by the scope of the following claims:

1. A scale comprising a plurality of pendulum systems, a scale beam and a single element having a connection at one end to said beam and connections at other points to each of said systems for connecting said beam to all of said systems to distribute a load therebetween.

2. A scale comprising a plurality of pendulum systems, a scale beam and a single continuously extending flexible element connecting said beam to each of said systems to distribute a load therebetween.

3. A scale comprising a plurality of pendulum systems, a scale beam and a flexible tape having one end connected to said beam and its other end connected to one of said systems and connected at intermediate points to the other systems.

4. A scale comprising a plurality of pendulum systems, a scale beam, a single element for interconnecting said systems together for conjoint operation and for connecting one only of said systems directly to said scale beam.

5. A scale comprising a plurality of pendulum systems one of which is provided with an operating cam and the remainder of which are each provided with an operating sector, a scale beam, a flexible element connecting said cam to the beam and a flexible element connecting said cam and each sector to the sector of another system independently of the scale beam.

6. A scale comprising a pair of pendulum systems one provided with an operating cam and the other with an operating sector, a scale beam, a flexible element connecting said beam to said cam and a flexible element connecting said cam to said sector.

7. A scale comprising a plurality of pendulum load offsetting mechanisms, a scale beam, a single element having a connection adjacent one end to said beam and having connections at other points to each of said mechanisms for connecting said beam to each of said mechanisms to proportion a load therebetween, means for offsetting said mechanisms to the normal limit of their travel when the scale registers zero and means for counterbalancing said last named means in response to weighing operations.

8. A scale comprising a plurality of pendulum load offsetting mechanisms, a scale beam, a single flexible element having a connection adjacent one end to said beam and having connections at other points to each of said mechanisms for connecting said load offsetting mechanisms to said beam, means coacting with said beam to initially offset said pendulum mechanisms about their pivots to the limit of their normal travel and means for counterbalancing said last named means in response to weighing operations.

9. A scale comprising a plurality of pendulum load offsetting mechanisms, a scale beam, a flexible element connecting said beam to one of said mechanisms and a flexible element connecting each of said mechanisms to another independently of the scale beam, to effect conjoint operation of all said mechanisms, means coacting with said beam to initially offset said pendulum mechanisms about their pivots to the limit of their normal travel and means for counterbalancing said last named means in response to weighing operations.

10. In a weighing scale, a load offsetting mechanism comprising a rigid and integral pendulum supporting structure with fixed non-adjustable configuration freely supported on a pivot and inherently balanced thereabout for all weighing positions and a pendulum weight supported on said structure eccentrically of said pivot.

11. In a weighing scale, a load offsetting mechanism comprising a pendulum supporting cam-faced structure with fixed non-adjustable configuration freely supported on a pivot and balanced thereabout for all weighing positions and a single resultant pendulous counterbalance supported on said structure eccentrically of said pivot and having its mass uniformly distributed about a predetermined, fixed radial line extending from the pivot.

12. In a weighing scale, a pendulum system consisting of a rigid structure freely mounted on a pivot and including a single adjusting means for varying the moment of inertia thereof by shifting the center of mass of said structure substantially along a fixed radial line extending from the pivot to the center of mass of said structure.

13. In a weighing scale, a load offsetting mechanism comprising an integral pendulum supporting structure with fixed non-adjustable configuration freely supported on a pivot and inherently balanced thereabout for all weighing positions and a pendulum weight mounted on said structure eccentrically of said pivot.

14. In a weighing scale, a load offsetting mechanism comprising an effectively integral non-adjustable supporting structure freely supported on a pivot and balanced thereabout for all weighing positions and having a face non-arcuately disposed about the pivot, a pendulum weight mounted on said structure eccentrically of said pivot and means for adjusting the center of mass of said pendulum weight in a fixed radial direction to the pivot point.

15. In a weighing scale, a load offsetting mechanism comprising an integral non-adjustable pendulum supporting structure freely supported on a pivot and balanced thereabout for all weighing positions, a pendulum weight mounted on said structure eccentrically of said pivot and a single adjusting element for shifting the center of mass of said pendulum weight along a fixed radial line extending from said pivot.

16. A weighing scale comprising a scale beam, a pair of load offsetting mechanisms interconnected for conjoint operation in response to a weighing operation and each consisting of an integral non-adjustable supporting structure freely supported on a pivot and balanced thereabout for all weighing positions and a pendulum weight mounted on each structure with means for adjusting its center of mass along a radial line from said pivot, an operating cam fixed to one of said load offsetting mechanisms and a flexible element connecting said cam to said scale beam.

17. A weighing scale comprising a scale beam, a pair of oppositely acting load offsetting mechanisms each consisting of an integral non-adjustable supporting structure freely supported on a pivot and balanced thereabout for all weighing positions and a pendulum weight mounted on each structure with means for adjusting its center of mass along a radial line from said pivot, an operating cam fixed to one of said load offsetting mechanisms, a flexible element connecting said cam to said scale beam, an operating sector connected to the other of said mechanisms and a flexible element connecting said sector to said cam.

18. In a weighing scale, a scale beam, a pivoted load offsetting pendulum with an adjustable element shiftable solely along a radial line joining the center of mass of the pendulum with its pivot point and an operating cam in fixed non-adjustable angular relationship to the line joining the pivot point and center of gravity of said pendulum and means operatively connecting said cam to said beam.

19. In a weighing scale, a scale beam, a pivoted pendulum supporting structure balanced about its pivot and provided with a pendulum weight thereon, an adjustable element for said pendulum weight movable solely along a radial line joining its center of mass with its pivot point, an operating cam supported on said structure in fixed non-adjustable relationship to said weight, and means operatively connecting said cam to said beam.

20. In a weighing scale, a scale beam, a pivoted pendulum supporting structure, a pendulum weight thereon with means for adjusting its center of mass along a radial line only of said structure, an operating cam fixed on said structure and means operatively connecting said cam to said beam.

21. In a scale, a load responsive member, a pivot, a structure balanced on the pivot and having all the parts thereof mechanically integrally constructed in invariable relationship to each other to render the structure inherently incapable of any adjustment for disturbing the balance of the structure, a counterbalance associated with the structure, an indicator associated with the structure, said structure having a cam connected to said load responsive member for causing equal increments of load acting on said member to effect equal movements of the indicator.

22. In a scale such as defined in claim 21, said counterbalance comprising a single pendulous mass rigidly carried by said structure and adjustable only in one predetermined, radial direction.

23. In a scale, a load responsive member, a rockable pendulous unit, an indicator associated with the unit, the unit having a cam face connected to said member for causing equal movements of the member to effect equal movements of the indicator, said unit having an effective pendulous mass making the unit pendulous only along a fixed, predetermined, radial direction, all the parts of said unit being mechanically constructed to render the unit inherently incapable of any adjustment to disturb the radial direction along which the unit is pendulous.

24. In a scale, a load responsive member, a pendulous load counterbalance, a rockable structure associated with the counterbalance and having a cam surface for compensating variations in the effective moment arm of the counterbalance as the latter moves to different angular positions, said cam surface and the moment arm of the counterbalance being relatively non-adjustable angularly, a device supported separately from the rockable structure, a connection between the latter and the device, an indicator operated by the device, and means connecting the cam surface with the load responsive member.

25. In a scale, a load responsive member, a pair of rockable structures, each balanced about its axis, counterbalance means associated with said structures, one of the latter having a cam surface operatively connected to the load responsive member and adapted to compensate for variations in effective resistance of the counterbalance means as the latter moves to different angular positions, and means interconnecting the structures for common movement.

In testimony whereof I hereto affix my signature.

JAMES W. BRYCE.